(12) United States Patent
Lee et al.

(10) Patent No.: US 9,258,489 B2
(45) Date of Patent: Feb. 9, 2016

(54) IMAGE ACQUISITION METHOD AND APPARATUS

(71) Applicant: Samsung Electronics Co., Ltd., Suwon-si, Gyeonggi-do (KR)

(72) Inventors: Hae-Sun Lee, Suwon-si (KR); Moon-Soo Kim, Seoul (KR); Jong-Keun Shin, Yongin-si (KR); Jong-Hyub Lee, Suwon-si (KR); Joo-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/501,637

(22) Filed: Sep. 30, 2014

(65) Prior Publication Data

US 2015/0092084 A1 Apr. 2, 2015

(30) Foreign Application Priority Data

Sep. 30, 2013 (KR) .................. 10-2013-0116306

(51) Int. Cl.
*H04N 5/235* (2006.01)
*H04N 5/225* (2006.01)

(52) U.S. Cl.
CPC ........... *H04N 5/2354* (2013.01); *H04N 5/2256* (2013.01)

(58) Field of Classification Search
CPC .... H04N 5/2256; H04N 5/2354; H04N 5/235
See application file for complete search history.

(56) References Cited

U.S. PATENT DOCUMENTS

2012/0188432 A1* 7/2012 Kubota ............... H04N 5/2352
                                                 348/333.01
2015/0092098 A1* 4/2015 Konishi ............... H04N 5/2352
                                                 348/333.11

FOREIGN PATENT DOCUMENTS

KR   10-2012-0115823 A   10/2012

* cited by examiner

*Primary Examiner* — Tuan Ho
(74) *Attorney, Agent, or Firm* — Jefferson IP Law, LLP

(57) ABSTRACT

A method and an apparatus for acquiring an image of a subject are provided. The method for acquiring the image of the subject includes acquiring a first preliminary image and a second preliminary image of the subject through an image sensor operatively coupled to an electronic device, determining a candidate emission time relating to an acquisition of an output image of the subject, based on a difference between state information of at least part of the first preliminary image and state information of at least part of the second preliminary image, comparing the candidate emission time with a time corresponding to a synchronization period where a plurality of lines of the image sensor simultaneously acquires the output image, and acquiring the output image of the subject based on the comparison.

20 Claims, 8 Drawing Sheets

IMAGE ACQUISITION METHOD AND APPARATUS

CROSS-REFERENCE TO RELATED APPLICATION(S)

This application claims the benefit under 35 U.S.C. §119(a) of a Korean patent application filed on Sep. 30, 2013 in the Korean Intellectual Property Office and assigned Serial number 10-2013-0116306, the entire disclosure of which is hereby incorporated by reference.

TECHNICAL FIELD

The present disclosure relates to an electronic device. More particularly, the present disclosure relates to a method and an apparatus for image acquisition.

BACKGROUND

A camera is an optical device for capturing still or moving images of a subject and widely applied to art, industrial, and academic fields. In recent, various mobile devices (e.g., mobile phone, laptop, or wearable electronic device) have a camera function based on technological advance, and thus general users can easily utilize the camera. The camera can include an image sensor for sensing an image and a flash for emitting light. The flash can include, for example, a light emitting diode (LED) flash and a xenon flash. The camera can adjust brightness of the image of the subject by controlling an intensity of the flash or an exposure time of the image sensor.

A camera (e.g., a camera including the LED flash) may apply the uniform exposure time of the image sensor and the uniform emission time of the flash to capture the subject. For example, the camera controls the flash to discharge the flash throughout the exposure time of the image sensor. Such a camera control method controls the image sensor and the flash emission time without considering a distance between the main subject and the camera and the exposure difference of the light (e.g., the light produced from the flash) according to a distance between the background and the camera. As a result, either the main subject or the background cannot obtain an adequate brightness.

For example, a main subject (e.g., a person) is close to the camera and other subject (e.g., the background) is far away from the camera. In this case, the distance difference of the main subject (e.g., the person) and the other subject (e.g., the background) can change the brightness of the corresponding image area (e.g., a main subject area or other subject area) according to the flash emission. For example, the main subject, which is close to the camera, can receive more light from the flash. Hence, the image area corresponding to the main subject is brighter than the user's intended brightness and the image of the main subject can be too much bright.

By contrast, the other subject, which is away from the camera, can receive little light from the flash. Accordingly, the image area corresponding to the other subject can be too dark to identify the other subject.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide image acquisition method and apparatus for obtaining an adequate brightness in the image areas corresponding to the main subject and the other subject by dynamically determining the flash emission time and the exposure time of the image sensor based on the exposure difference of the light source (e.g., the flash light).

In accordance with an aspect of the present disclosure, a method of an electronic device for acquiring an image of a subject is provided. The method includes acquiring a first preliminary image and a second preliminary image of the subject through an image sensor operatively coupled to the electronic device, determining a candidate emission time relating to an acquisition of an output image of the subject, based on a difference between state information of at least part of the first preliminary image and state information of at least part of the second preliminary image, comparing the candidate emission time with a time corresponding to a synchronization period where a plurality of lines of the image sensor simultaneously acquires the output image, and acquiring the output image of the subject based on the comparison, wherein the acquiring of the output image further includes, when the candidate emission time is smaller than or equal to the synchronization period, controlling a light emitting module operatively coupled to the electronic device to produce light during the candidate emission time in the synchronization period.

In accordance with another aspect of the present disclosure, an electronic device for acquiring an image of a subject is provided. The electronic device includes a light emitting module configured to emit light, an image sensor configured to acquire a first preliminary image and a second preliminary image of a subject, a calculation module configured to determine a difference between state information of at least part of the first preliminary image and state information of at least part of the second preliminary image, and a determination module configured to determine a candidate emission time relating to an acquisition of an output image of the subject, based on the calculated difference, wherein the determination module is further configured to compare the candidate emission time with a time corresponding to a synchronization period where a plurality of lines of the image sensor simultaneously acquires the output image, and when the candidate emission time is smaller than or equal to the synchronization period, to acquire the output image by controlling the light emitting module to produce light during the candidate emission time in the synchronization period.

In accordance with an aspect of the present disclosure, a non-transitory computer-readable recording medium having a computer program thereon is provided, wherein the computer program causes a computer to execute a method. The method includes acquiring a first preliminary image and a second preliminary image of the subject through an image sensor operatively coupled to an electronic device, determining a candidate emission time relating to an acquisition of an output image of the subject, based on a difference between state information of at least part of the first preliminary image and state information of at least part of the second preliminary image, comparing the candidate emission time with a time corresponding to a synchronization period where a plurality of lines of the image sensor simultaneously acquires the output image, and acquiring the output image of the subject based on the comparison, wherein the acquiring of the output image further includes, when the candidate emission time is smaller than or equal to the synchronization period, controlling a light emitting module operatively coupled to the electronic device to produce light during the candidate emission time in the synchronization period.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
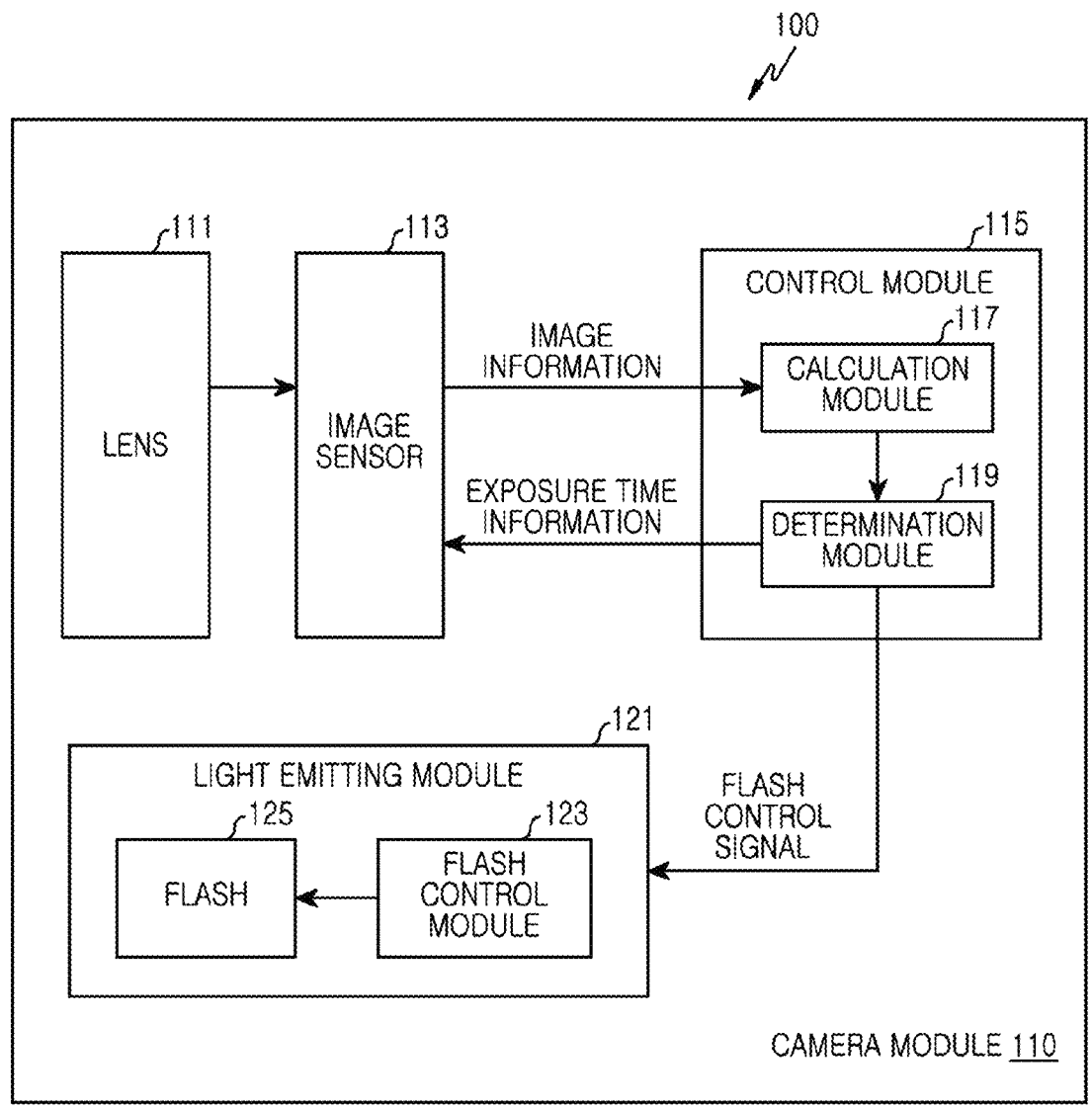
FIG. 1 illustrates a camera module of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure can be a device including a camera or a camera function. For example, the electronic device can include a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical appliance, and a wearable device (e.g., at least one of a head-mounted-device (HMD) such as electronic glasses, an electronic textiles, an electronic bracelet, an electronic necklace, an electronic accessory, and a smart watch).

The electronic device can be a smart home appliance having the camera function. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, and a digital frame.

The electronic device can include at least one of various medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), avionics, a home or industrial robot, and a security device, with the camera function.

The electronic device can include at least one of furniture or part of building/structure having the camera function, an electronic board, an electronic signature receiving device, a projector, and various gauges (e.g., gauges for water, electricity, or radio wave). The electronic device can be one or a combination of those various devices. Those skilled in the art shall understand that the electronic device of the present disclosure is not limited those devices. Now, an electronic device and a method for acquiring (e.g., capturing) an image are explained by referring to the attached drawings.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a camera module of an electronic device according to an embodiment of the present disclosure. The camera module can employ a camera or a camera module (e.g., a camera 891 of FIG. 8 to be later explained).

Referring to FIG. 1, a camera module 110 is illustrated, where the camera module can include a lens 111, an image sensor 113, a camera module 115, and a light emitting module 121. The lens 111 can be an optical component for receiving an optimal image of a subject. For example, the lens 111 can include at least one of a zoom lens, a focus lens, and an apochromatic lens. The zoom lens can adjust the size, the focus lens can adjust a point of the subject, and the apochromatic lens can distort the image of the subject. Each lens can include one or more lenses.

The image sensor 113 can convert an incident optimal image from the lens 111 to an electric signal and acquire (e.g., capture) the image (e.g., a digital image) of the subject. The image sensor 113 can acquire an image of different properties according to a mode of the camera module 110. For example, in a flash mode, the image sensor 113 can acquire preliminary images of different brightness under different light emission (e.g., light intensity) of the light emitting module 121. For example, the image sensor 131 can acquire a first preliminary image of a first brightness in non-flash mode (e.g., no flash) of the light intensity 0 of the light emitting module 121, and acquire a second preliminary image of a second brightness of the light intensity greater than 0 (e.g., pre-flash) of the light emitting module 121.

The preliminary image can be temporarily acquired before the output image acquisition so as to acquire the image (hereafter, referred to as an output image) finally output to the user when the user wants the flash mode. The flash mode can emit the light emitting module 121 with the light intensity set by a user through a menu of the camera module 110, or automatically light the light emitting module 121 according to an external luminance.

The image sensor 113 can provide the acquired image information (e.g., the captured image data) to the control module 115. The image sensor 113 can sense (e.g., capture) the image based on exposure time information received from the control module 115. In the flash mode, the image sensor 113 can receive its exposure time information determined based on first preliminary image information and second preliminary image information from the control module 115, and sense the output image based on the exposure time information (e.g., during the determined exposure time). For example, the image sensor 113 can employ a Complementary Metal-Oxide Semiconductor (CMOS) sensor, a Charged Coupled Device (CCD) image sensor, and a Foveon image sensor. For example, the image sensor 113 can be driven as at least one of a rolling shutter and a global shutter.

The control module 115 can control at least one of the modules (e.g., the lens 111, the image sensor 113, and the light emitting module 121) of the camera module 110 to capture the image of the subject. The control module 115 can include a calculation module 117 and a determination module 119. The calculation module 117 can determine one or more brightness information of the image information based on the image information (e.g., the first preliminary image or the second preliminary image) of the given subject, which is provided from the image sensor 113.

For example, each image (the first preliminary image or the second preliminary image) can be divided into a plurality of image subareas corresponding to a plurality of pixel groups of the image sensor 113 respectively. The pixel groups can include at least one of pixels of the image sensor 113. In this case, the calculation module 117 can determine the brightness information of the image subareas. The calculation module 117 can determine the image brightness information (in all or in average) by weighting one or more brightness information of the image subareas of the image.

The calculation module 117 can determine a difference between one or more brightness information of the image subareas corresponding to one image (e.g., the first preliminary image) and one or more brightness information of the image subareas corresponding to the other image (e.g., the second preliminary image). For example, the calculation module 117 can calculate at least one of the brightness differences of the corresponding image subareas (e.g., the same pixel group) of the first preliminary image and the second preliminary image.

The calculation module 117 may calculate the brightness information of the image subareas based on distance information between the subject and the lens. For example, the calculation module 117 can calculate the brightness information difference of the image subareas of the same or similar distance information between a light source (e.g., the flash 125) and the subject in the first preliminary image and the second preliminary image. For example, the calculation module 117 can calculate the brightness difference between the image subarea corresponding to the distance information from 1 m to 2 m between the subject and the light source in the first preliminary image, and the image subarea corresponding to the distance information from 1 m to 2 m between the subject and the light source in the second preliminary image.

To acquire (e.g., capture) the image (e.g., the output image) of the subject, the calculation module 117 can determine the exposure time of the image sensor 113 taken to acquire the image (e.g., the first preliminary image or the second preliminary image). For example, when the image sensor 113 acquires the first preliminary image with a two second exposure, the calculation module 117 can determine the exposure time of the first preliminary image as two seconds. The calculation module 117 can determine not only the exposure time of the image sensor 113 for the image acquisition but also a gain of the image sensor 113. The gain of the image sensor 113 can be a ratio (e.g., photoconversion ratio) of the optical signal received from the lens 111 to the electric signal. The gain can be used to determine the exposure of the image sensor 113 together with the exposure time of the image sensor 113. For example, the exposure of the image sensor 113 can combine the exposure time and the gain of the image sensor 113 according to a preset algorithm.

The calculation module 117 can calculate at least one of the brightness information (e.g., the total or average brightness of the image) of the given image (e.g., the first preliminary image or the second preliminary image) of the subject, the brightness information corresponding to the image subareas respectively of the image, and the brightness difference of the corresponding image subareas (e.g., the same pixel group) of the two corresponding images (e.g., the first preliminary image and the second preliminary image), and provides at least one of them to the determination module 119. A method of the control module 115 (e.g., the calculation module 117) for determining various information relating to the brightness of the image shall be explained by referring to FIG. 2.

The determination module 119 can determine the exposure time of the image sensor 113 to acquire the output image, based on the brightness difference (e.g., the whole or average brightness of the first preliminary image and the second preliminary image) of the first preliminary image and the second preliminary image. The determination module 119 can provide the exposure time information to the image sensor 113 so as to control the image sensor 113 to sense (e.g., capture) the data of the output image during the exposure time. For example, the determination module 119 can generate an image control signal based on the exposure time information. The determination module 119 can send the image control signal including the exposure time information to the image sensor 113 to control the image sensor 113 to sense the output image of the subject during the exposure time.

The determination module 119 can determine the emission mode (e.g., an emission time or the emission intensity) of the light emitting module 121 required to acquire the image (e.g., the output image) based on the information provided from the calculation module 117. The determination module 119 can determine the emission time (hereafter, referred to as a candidate emission time) of the light emitting module 121 estimated for the output image acquisition of the subject, based on the brightness difference of at least one (e.g., the image subarea of the first preliminary image and the image subarea of the second preliminary image of the same pixel group of the pixel groups of the image sensor 113) of the image subareas of the first preliminary image and the second preliminary image of the subject.

The determination module 119 can determine an emission reference time based on the exposure time of the image sensor 113 determined for the output image acquisition of the subject and a driving signal (e.g., a vertical synchronization signal Vsync of one frame) for controlling the image sensor 113. The emission reference time can be used to determine whether the candidate emission time can be the actual emission time (hereafter, referred to as a target emission time) of the light emitting module 121 for the output image acquisition. The emission reference time shall be explained by referring to FIG. 3.

When the candidate emission time satisfies the emission reference time, the determination module 119 can control the light emitting module 121 to produce the light during the candidate emission time for the output image acquisition. For example, when the candidate emission time is smaller than or equal to the emission reference time, the determination module 119 can determine the candidate emission time as the actual emission time, for example, as the target emission time of the light emitting module 121 for the output image acquisition.

For example, when the candidate emission time is greater than the emission reference time, the determination module 119 can determine the target emission time based on the exposure time of the image sensor 113 determined for the output image acquisition. For example, when the candidate emission time is greater than the emission reference time, the determination module 119 can determine the target emission time for the output image acquisition by adding the exposure time and an image readout time of the image sensor 113.

To determine the target emission time for the output image acquisition, the determination module 119 can compare the exposure time for the output image acquisition with a preset referee time (hereafter, referred to as an exposure reference time). For example, the exposure reference time can be used to determine whether the exposure time can be used for the target emission time. For example, the determination module 119 can determine the target emission time by comparing the exposure time and the exposure reference time.

For example, when the exposure time is smaller than or equal to the exposure reference time, the determination module 119 can determine the target emission time for the output image acquisition by adding the exposure time and the image readout time of the image sensor 113. By contrast, when the exposure time is greater than the exposure reference time, the determination module 119 can determine the target emission time by comparing the candidate emission time and the emission reference time as stated above. To determine the target emission time, the comparison of the exposure time and the exposure reference time can be omitted according to characteristics or design of the electronic device. The exposure reference time shall be explained by referring to FIG. 3.

The determination module 119 can generate a flash control signal based on the target emission time determined based on at least one of the candidate emission time and the exposure time. The determination module 119 can control the light emitting module 121 to produce the light during the target emission time for the output image acquisition by sending the flash control signal to the light emitting module 121.

The light emitting module 121 can control the emission time of an artificial lighting (e.g., the flash) required to acquire the output image based on the flash control signal received from the determination module 119. The light emitting module 121 can include a flash control module 123 and a flash 125. The flash control module 123 can control at least one of the light intensity (e.g., the emission time) and an on/off timing of the flash 125 based on the received flash control signal. For example, the flash control module 123 can control the emission (e.g., the emission time) of the flash 125 by controlling voltage (or current flowing through the flash 125) supplied to the flash 125 based on the flash control signal. The flash 125 produces the light under the control of the flash control module 123. For example, the flash 125 can include at least one of an LED flash and a xenon flash.

Figure 2:
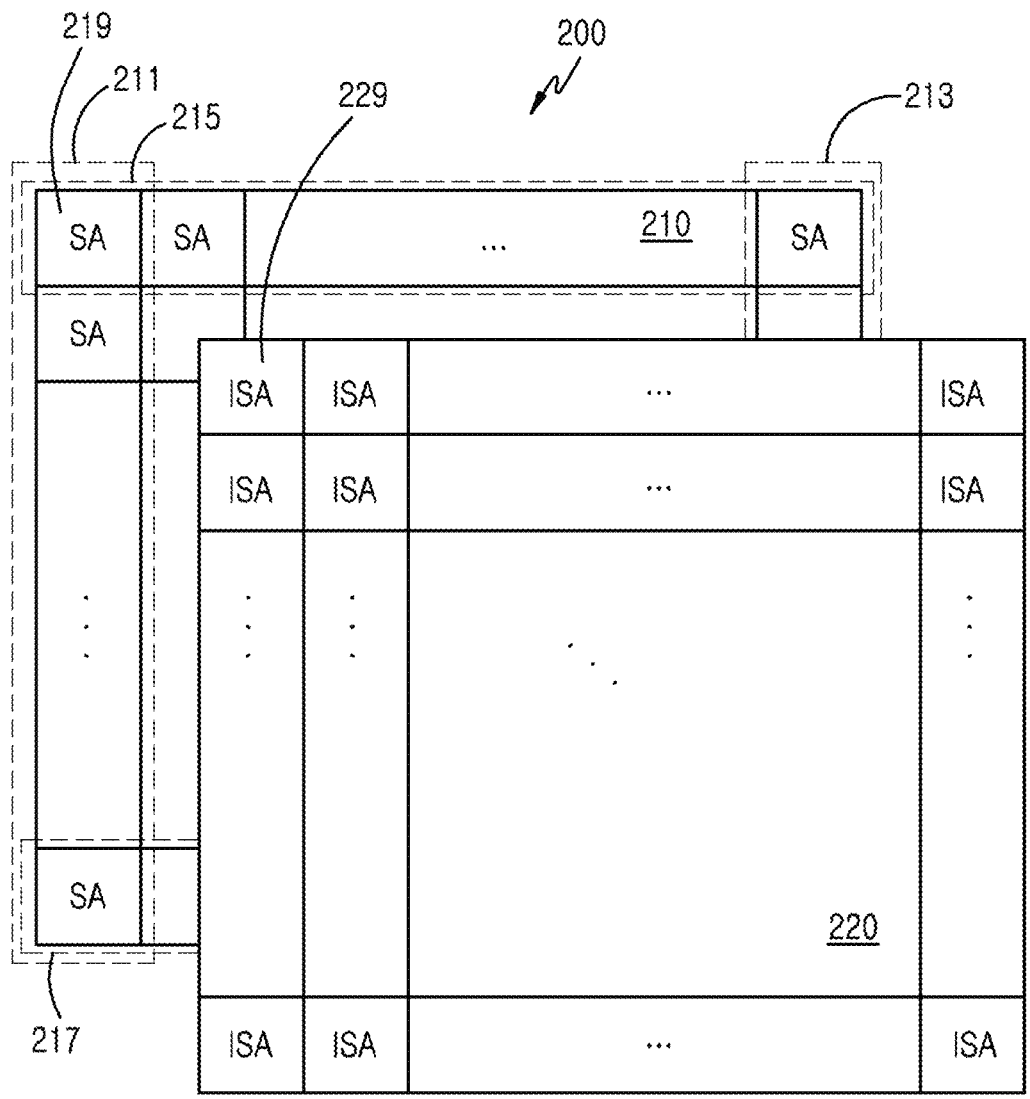
FIG. 2 illustrates an image sensor and image information acquired by the image sensor according to an embodiment of the present disclosure.

Now, a method for determining the brightness information relating to the image information through the camera module (e.g., the calculation module 117 of FIG. 1) is explained by referring to FIG. 2.

FIG. 2 illustrates an image sensor and image information acquired by the image sensor according to an embodiment of the present disclosure.

Referring to FIG. 2, a conceptual diagram 200 of an image sensor 210 (e.g., the image sensor 113 of FIG. 1) is illustrated, where the image sensor 210 can include a plurality of subareas (SAs) 219 (e.g., a plurality of pixel groups) including a matrix with first through N-th columns 211 through 213 and first through M-th rows 215 through 217. The each SA can include at least part of pixels (not shown) of the image sensor 210.

Image information 220 (e.g., the first preliminary image or the second preliminary image) obtained from the image sensor 210 can be divided into a plurality of image subareas (ISAs) corresponding to the SAs. For example, the ISA 229 of the first row and the first column of the ISAs can correspond to the SA 219 of the first row and the first column of the image sensor 210. In this case, the ISA 229 of the image information 210 can include, for example, image data of the subject obtained from the SA 219 of the image sensor 210.

Each ISA can correspond to, for example, an automatic exposure window. The automatic exposure window can be a subblock divided to automatically determine the exposure (e.g., the exposure determined based on the gain and the exposure time) of the image sensor 210 of the camera module 110 of FIG. 1 based on the brightness (e.g., luminance) of the subject. Each ISA of the image information 220 can contain proper brightness information based on the brightness of the area corresponding to the subject. The proper brightness information of the ISAs can be determined using, for example, automatic exposure window information or an algorithm of a designer.

The camera module (e.g., the calculation module 117 of FIG. 1) can determine, for example, an image histogram, the brightest part of the image, the darkest part of the image, and the image brightness (e.g., the whole or average image brightness) based on the brightness information of the ISAs of the image information 220 of the subject. To determine the image brightness information, the camera module (e.g., the determination module 119 of FIG. 1) can use, for example, the brightness information of the ISAs of the image information 220 and image metering. For example, the determination module can determine the image brightness information by applying a different weight to the brightness information of the ISA according to the image metering.

The image metering can include center-weighted metering, average metering, spot metering, and evaluative metering according to the weight applied to the ISAs. The center-weighted metering applies the highest weight to the central part of the image, the average metering applies the same weight to a plurality of groups, the spot metering applies the highest weight to the group selected by the user, and the evaluative metering applies the high weight to the group determined based on the image analysis.

Figure 3:
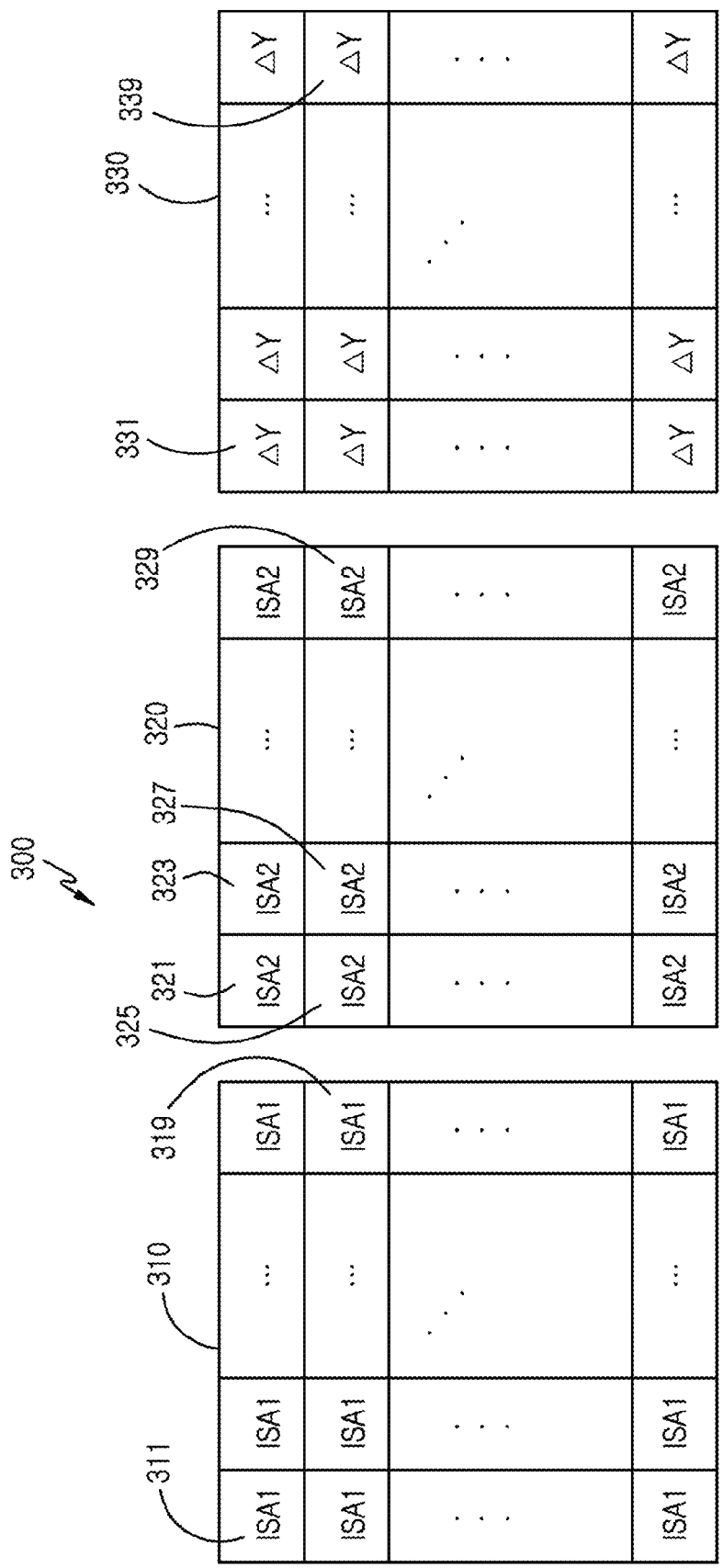
FIG. 3 illustrates image brightness information including a brightness difference of image subareas of images according to an embodiment of the present disclosure.

FIG. 3 illustrates image brightness information including a brightness difference of ISAs of images (e.g., a first preliminary image and a second preliminary image) according to an embodiment of the present disclosure.

Referring to FIG. 3, a conceptual diagram 300 is illustrated, where the conceptual diagram 300 can include the first preliminary image 310, which can be divided into a plurality of first ISA1s. The second preliminary image 320 can be divided into a plurality of second ISA2s. The ISA1s and the ISA2s each can contain their own brightness value according to the brightness of the area corresponding to the subject.

The camera module (e.g., the calculation module 117 of FIG. 1) can determine the brightness difference (e.g., luminance difference) ΔY of the area corresponding to the image brightness information 330 by comparing the brightness between at least part (e.g., at least one ISA1) of the first preliminary image 310 and at least part (e.g., at least one ISA2) of the second preliminary image 320. For example, the calculation module can determine the brightness difference ΔY between the first ISA1 311 of the first preliminary image 310 and the second ISA2 321 of the second preliminary image 320 corresponding to the same SA in the image sensor (e.g., the image sensor 210 of FIG. 2). The calculation module can determine the brightness difference of a first ISA1 311 and a second ISA2 321 as the brightness difference of a corresponding area 331 of the image brightness information 330.

The calculation module can determine the brightness difference between the first ISA1 311 of the first preliminary image 310 and the second ISA2 321 of the second preliminary image 320 corresponding to the same area of the image sensor. The calculation module can determine the brightness difference between the first ISA1 311 of the first preliminary image 310 and the second ISA2 321 of the second preliminary image 320 corresponding to different areas of the image sensor. For example, the calculation module can determine the brightness difference between at least one ISA1 and the ISA2 (e.g., the ISA2 corresponding to the area adjoining the ISA1) next to the ISA1. For example, the calculation module can determine the brightness difference between the first ISA1 311 of the first preliminary image 310 and at least one of second ISA2s 321, 323, 325, and 327 of the second preliminary image 320. For example, the calculation module can set the determined brightness difference to the brightness difference ΔY of the area 331 of the image brightness information 330 corresponding to the first ISA1 311. For example, the camera module can give priority to the brightness difference ΔY in a descending order, and determine the candidate emission time using the brightness difference ΔY corresponding to the designated priority (e.g., the priority corresponding to the designated range).

For example, to determine the candidate emission time of the light emitting module (e.g., the light emitting module 121 of FIG. 1) for the output image acquisition, the camera module (e.g., the determination module 119 of FIG. 1) can use the greatest one of the brightness differences of the ISA1 and the ISA2 of the first preliminary image 310 and the second preliminary image 320. For example, when the brightness difference of the first ISA1 319 of the first preliminary image 310 and the second ISA2 329 of the second preliminary image 320 is the greatest value, the determination module can use the brightness difference ΔY of the area 339 corresponding to the ISAs 319 and 329 of the image brightness information 330.

To determine at least one of the candidate emission time and the exposure time for the output image acquisition, the determination module can use at least one of the brightness of the first preliminary image 310 (e.g., the whole or average brightness of the first preliminary image 310), the brightness of the second preliminary image 320, the intensity information of the light emitting module (the light emitting module 121 of FIG. 1) corresponding to the first preliminary image 310 and the second preliminary image 320, and the preset intensity information or the preset image brightness information of the light emitting module for the output image acquisition (e.g., the image brightness set by the user or automatically for the output image acquisition), which is given by Equation 1.

$$\text{Flash\_AE\_Target} \approx (N\_\text{Flash\_Y} + P\_\text{Flash\_}\Delta y \times M\_\text{Flash\_}L/P\_\text{Flash\_}L)/N\_\text{Flash\_Exp.Factors} \times M\_\text{Flash\_Exp.Factors} \quad \text{Equation (1)}$$

The components of Equation 1 are defined as follows.

Flash_AE_Target denotes the image brightness set for acquiring the output image, for example, the target output image brightness information. N_Flash_Y denotes the brightness of the first preliminary image 310. P_Flash_ΔY denotes the brightness difference of a particular area of the first preliminary image 310 and the second preliminary image 320. M_Flash_L denotes the intensity of the flash (e.g., the flash 125 of FIG. 1) set for the output image acquisition.

P_Flash_L denotes the intensity of the flash used to acquire the second preliminary image 320. N_Flash_Exp.Factors denotes the exposure (e.g., the combined value of the exposure time and the gain) of the image sensor to acquire the first preliminary image 310. M_Flash_Exp.Factors denotes the candidate emission time or the exposure of the image sensor for the output image acquisition. For example, Flash_AE_Target and P_Flash_L can be specified using a program. N_Flash_Y, N_Flash_Exp.Factors, and P_Flash_ΔY can be calculated by the calculation module as stated earlier. M_Flash_L can be fixed to a specific value.

To determine the candidate emission time for the output image acquisition, P_Flash_ΔY can use the greatest one (e.g., the brightness difference corresponding to the area 339 of the image brightness information 330) of the brightness differences of the ISAs of the first preliminary image 310 and the second preliminary image 320. To determine the exposure time of the image sensor for the output image acquisition, P_Flash_ΔY can use the brightness difference of the first preliminary image 310 and the second preliminary image 320 (e.g., the average brightness difference of the first preliminary image 310 and the second preliminary image 320). To determine the exposure time of the image sensor, the gain of the image sensor can be set to a specific value.

To determine the candidate emission time, the greatest one of the brightness differences ΔY of the ISAs of the first preliminary image 310 and the second preliminary image 320 is used so that the light emitting module can illuminate the brightest area of the subject with the adequate brightness (e.g., the unsaturated light) with the flash by emitting the light based on the brightness area of the subject. To determine the exposure time of the image sensor for the output image acquisition, the brightness difference of the first preliminary image 310 and the second preliminary image 320 is used so that a particular area (e.g., the dark area) of the output image can attain the adequate brightness by exposing the image sensor based on the brightness of the whole image.

Figure 4:
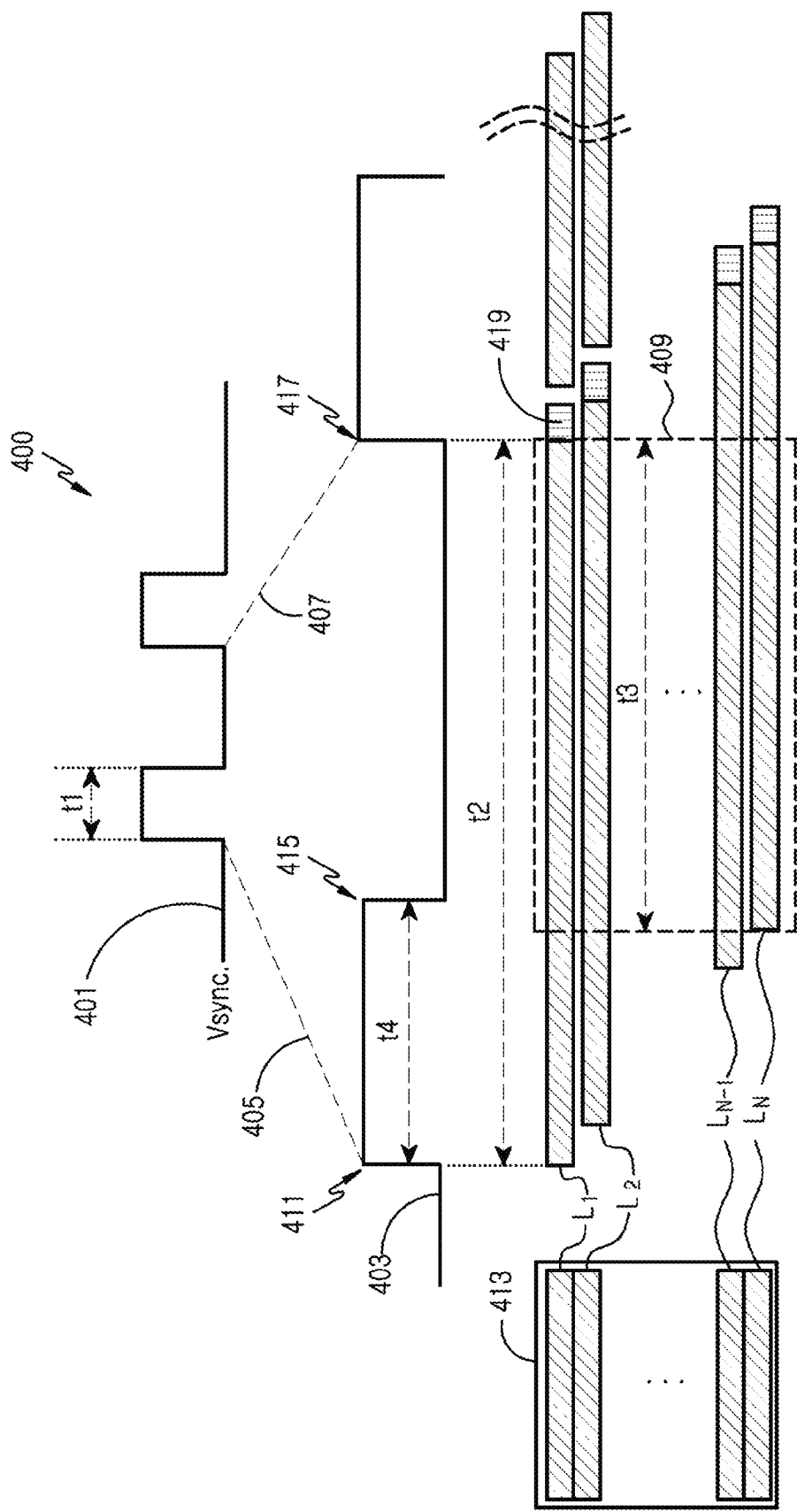
FIG. 4 illustrates operation timings of an image sensor according to an embodiment of the present disclosure.

FIG. 4 illustrates operation timings of an image sensor according to an embodiment of the present disclosure.

Referring to FIG. 4, operation timings 400 are illustrated, where a first waveform 401 relates to a driving signal (e.g., a vertical synchronization signal Vsync) of an image sensor 413. A second waveform 403 magnifies a portion corresponding to a first dotted line 405 and a second dotted line 407 of the first waveform 401. The image sensor 413 (e.g., the image sensor 113 of FIG. 1) can include a plurality of lines (e.g., a plurality of horizontal lines) $L_1$ through $L_N$. The lines $L_1$ through $L_N$ each can include a plurality of pixels (not shown). The lines $L_1$ through $L_N$ of the image sensor 413 can sequentially acquire (e.g., capture) the image information (e.g., the first preliminary image 310, the second preliminary image 320, or the output image) based on the driving signal (e.g., the vertical synchronization signal Vsync) of the image sensor 413.

For example, the lines $L_1$ through $L_N$ of the image sensor 413 can be exposed during an exposure time t2 to acquire the output image information. The pixels of the image sensor 413 can be exposed in sequence. A time gap corresponding to a line readout time 419 can take place between an exposure of a first pixel (e.g., a first pixel of the first line $L_1$) of a current line and an exposure of a first pixel (e.g., a first pixel of a second line $L_2$) of a next line. The line readout time 419 can store, for example, the image information (e.g., the output image information corresponding to the lines) of the subject acquired by the lines $L_1$ through $L_N$. The line readout time 419 can be variously set according to a designer or characteristics of the electronic device.

A time t1 can be an exposure reference time. The exposure reference time t1 can be used to determine whether the exposure time t2 determined for the output image acquisition can be used as an emission time of the light emitting module (e.g., the light emitting module 121 of FIG. 1) for the output image acquisition. The exposure reference time t1 can be, for example, an image readout time. This is because a period for acquiring the output image in the lines $L_1$ through $L_N$ at the same time (hereafter, referred to as a synchronization period 409) is not sufficient when the exposure time t2 of the image sensor 413 is smaller than or equal to the image readout time. In this case, the emission time for the output image acquisition can be a sum of a whole exposure time t2 and the image readout time. When the exposure time t2 is greater than the image readout time, the emission time for the output image acquisition can be determined based on the candidate emission time as mentioned above.

The exposure reference time t1 can be 1/Frame Per Second (FPS)_max. The FPS can indicate the number of frames per second in the image sensor 413. The image sensor 413 can include the frames in various numbers per second in the electronic device according to the design of the electronic device. For example, the image sensor 413 can include the frames between 15 frames and 60 frames per second. In this case, FPS max can be set to a specific number of frames (e.g., 15 frames) according to the user's setting or the environment. The exposure reference time t1 can be designed variously according to the designer or the characteristics of the electronic device.

A time t3 for the synchronization period 409 can range from a start when N-th line $L_N$ being the last line of the image sensor 413 acquires the image information (e.g., the output image) to the end when the first line $L_1$ acquires the image information (e.g., the output image). According to the design of the electronic device, the synchronization period 409 can lie between an end 415 of the current frame and a start 417 of the next frame. The time t3 for the synchronization period 409 can have a preset error (e.g., the line readout time) from the time 415 of the frame according to the design.

The synchronization period 409 can be determined using at least one of a Start of Frame (SOF) 411 and an End of Frame (EOF) 415 of the vertical synchronization signal Vsync. For example, the synchronization period 409 can start after an image readout time t4 from the exposure time t2 of the image sensor 413. The image readout time t4 is a fixed value according to a pixel clock and image frame register setting of the image sensor 413, and accordingly the synchronization period 409 can be determined using the SOF, the EOF, or a timer. The synchronization period 409 can vary based on the image readout time, the line readout time, or other factors (e.g., the characteristics of the electronic device).

The time t3 for the synchronization period 409 can be the emission reference time for the output image acquisition. To acquire the output image of the subject, when the candidate emission time is smaller than or equal to the time t3 for the synchronization period 409, the control module (e.g., the control module 115 of FIG. 1) of the electronic device can control the light emitting module (e.g., the light emitting module 121 of FIG. 1) to produce the light during the candidate emission time in the synchronization period 409. As all the pixels of the image sensor 413 are exposed in the synchronization period 409, every pixel can receive the light (e.g., the same intensity) of the flash.

An electronic device for acquiring an image of a subject includes a light emitting module for emitting light, an image sensor for acquiring a first preliminary image and a second preliminary image of the subject, a calculation module for determining a difference between state information of at least part of the first preliminary image and state information of at least part of the second preliminary image, and a determination module for determining a candidate emission time relating to output image acquisition of the subject, based on the difference. The determination module compares the candidate emission time with a time corresponding to a synchronization period where a plurality of lines of the image sensor simultaneously acquires the output image, and when the candidate emission time is smaller than or equal to the synchronization period, acquires the output image by controlling the light emitting module to produce light during the candidate emission time in the synchronization period.

The image sensor acquires the first preliminary image without the emission of the light emitting module, and acquires the second preliminary image with a preset intensity which is greater than non-emission, of the light emitting module.

The calculation module uses brightness information as the state information of the first preliminary image and the second preliminary image.

The calculation module determines brightness information of the first preliminary image based on state information of at least part of the first preliminary image, determines brightness information of the second preliminary image based on state information of at least part of the second preliminary image, and determines a brightness difference of the first preliminary image and the second preliminary image, based on the brightness information of the first preliminary image and the brightness information of the second preliminary image.

The calculation module determines brightness information of at least one of first Image Sub Areas (ISAs) of the first preliminary image, determines brightness information of at least one of second ISAs of the second preliminary image, and determines at least one brightness difference of the first ISAs and the second ISAs.

The determination module determines the candidate emission time using a maximum brightness difference of the at least one brightness difference.

The determination module determines an exposure time of the image sensor to acquire the output image, based on the brightness difference of the first preliminary image and the second preliminary image.

When the candidate emission time is greater than the synchronization period, the determination module controls the light emitting module to produce the light based on a sum of the exposure time and the output image readout time of the lines.

The electronic device (e.g., the camera module 110) acquires the first preliminary image and the second preliminary image, determines whether a mode for acquiring the output image is a flash mode for lighting the light emitting module, and when the mode is the flash mode, acquires the first preliminary image and the second preliminary image.

The electronic device acquires the first preliminary image using the light emitting module of a first light intensity, and acquires the second preliminary image using the light emitting module of a second light intensity which is different from the first light intensity.

To determine the candidate emission time, the electronic device uses brightness information as state information of the first preliminary image and the second preliminary image.

To determine the candidate emission time, the electronic device determines brightness information of the first preliminary image based on state information of at least part of the first preliminary image, determines brightness information of the second preliminary image based on state information of at least part of the second preliminary image, and determines a brightness difference of the first preliminary image and the second preliminary image, based on the brightness information of the first preliminary image and the brightness information of the second preliminary image.

To determine the candidate emission time, the electronic device determines brightness information of at least one of first ISAs of the first preliminary image, determines brightness information of at least one of second ISAs of the second preliminary image, determines at least one brightness difference of the first ISAs and the second ISAs, and determines the candidate emission time using the brightness difference corresponding to a preset priority of the at least one brightness difference.

To determine the candidate emission time, the electronic device determines the candidate emission time based on at least one of the brightness of the first preliminary image and the second preliminary image, light intensity information corresponding to the first preliminary image and the second preliminary image, preset light intensity information for acquiring the output image, and preset image brightness information for acquiring the output image.

To determine the candidate emission time, the electronic device determines an exposure time of the image sensor for the output image acquisition, based on the brightness difference of the first preliminary image and the second preliminary image.

To acquire the output image, the electronic device compares the exposure time with a preset reference time relating to the emission time for the output image acquisition, and when the exposure time is smaller than or equal to the reference time, controls the light emitting module to produce the light based on a sum of the exposure time and a third image readout time of the lines.

To acquire the output image, when the candidate emission time is greater than the synchronization period, the electronic device controls the light emitting module to produce the light based on a sum of the exposure time and the output image readout time of the lines.

The lines includes first through N-th (N is a natural number greater than 1) lines, and the electronic device uses a period from a start of the output image information acquisition of the N-th line to an end of the output image information acquisition of the first line, as the synchronization period.

A computer-readable recording medium records program operations including acquiring a first preliminary image and a second preliminary image of a subject through an image sensor operatively coupled to an electronic device, determining a candidate emission time relating to output image acquisition of the subject, based on a difference between state information of at least part of the first preliminary image and state information of at least part of the second preliminary image, comparing the candidate emission time with a time corresponding to a synchronization period where a plurality of lines of the image sensor simultaneously acquires the output image, and acquiring the output image of the subject based on the comparison. The acquiring of the output image includes when the candidate emission time is smaller than or equal to the synchronization period, controlling a light emitting module operatively coupled to the electronic device to produce light during the candidate emission time in the synchronization period.

Figure 5:
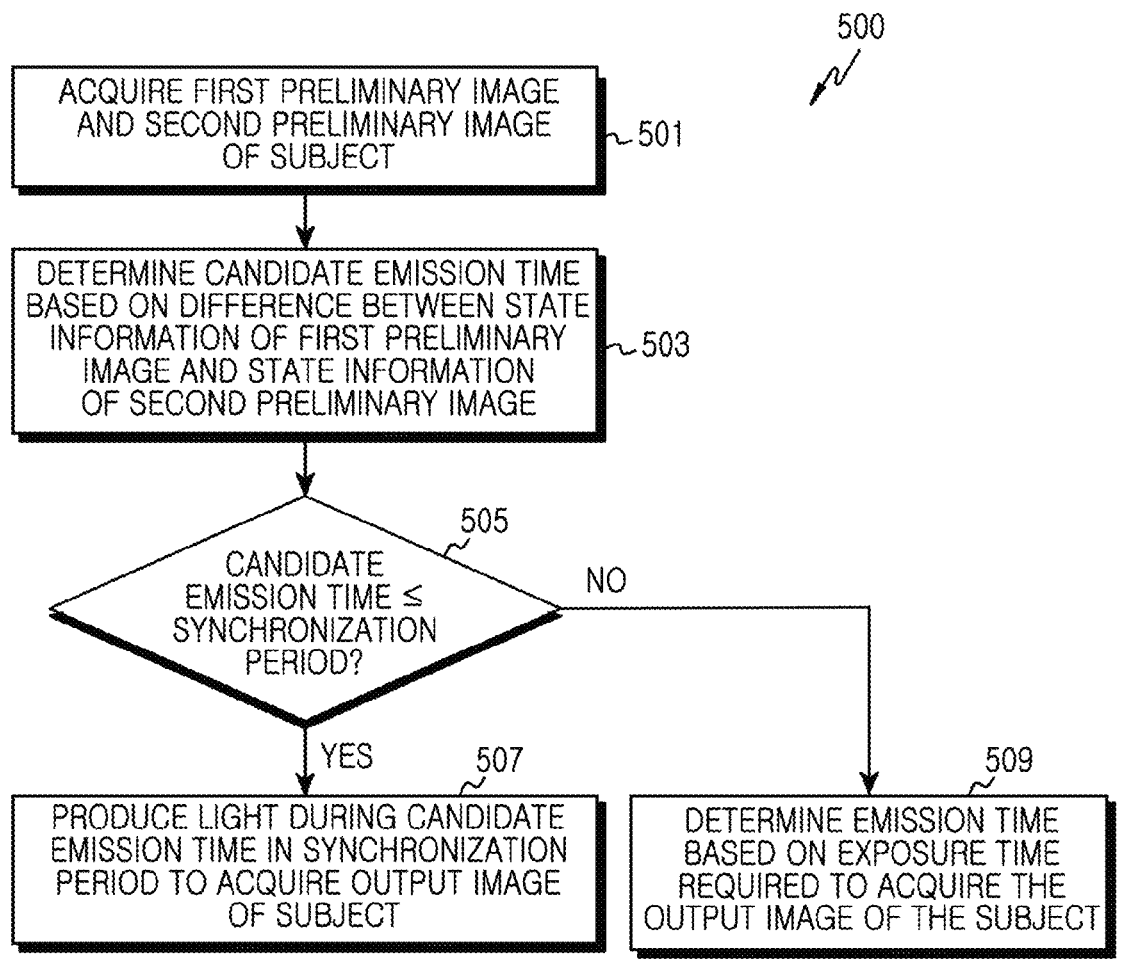
FIG. 5 illustrates a method for acquiring an image in an electronic device according to an embodiment of the present disclosure.

FIG. 5 illustrates a method for acquiring an image (e.g., an output image) in an electronic device (e.g., the camera module 110 of FIG. 1) according to an embodiment of the present disclosure.

Referring to FIG. 5, a flowchart 500 is illustrated, where an electronic device (e.g., the determination module 119 of FIG. 1) can determine whether a mode for output image acquisition is a flash mode. When determining the flash mode, the electronic device (e.g., the image sensor 113 of FIG. 1) can acquire the first preliminary image and the second preliminary image of the subject in operation 501. In the non-flash mode, the electronic device can acquire the output image of the subject without acquiring the first preliminary image 310 or the second preliminary image.

In operation 503, the electronic device (e.g., the determination module 117 of FIG. 1) can determine the candidate emission time to acquire the output image of the subject based on the difference between state information (e.g., the brightness information of at least part of the first preliminary image 310) of the first preliminary image and state information (e.g., the brightness information of at least part of the second preliminary image 320) of the second preliminary image.

In operation 505, the electronic device (e.g., the determination module 117 of FIG. 1) can compare the candidate emission time and the synchronization period. When the candidate emission time is smaller than or equal to the synchronization period, the electronic device can control the light emitting module (e.g., the light emitting module 121 of FIG. 1) to produce the light during the candidate emission time in the synchronization period to acquire the output image of the subject in operation 507. When the candidate emission time is greater than the synchronization period time, the electronic device can determine the emission time required to acquire the output image of the subject, based on the exposure time of the image sensor in operation 509.

Figure 6:
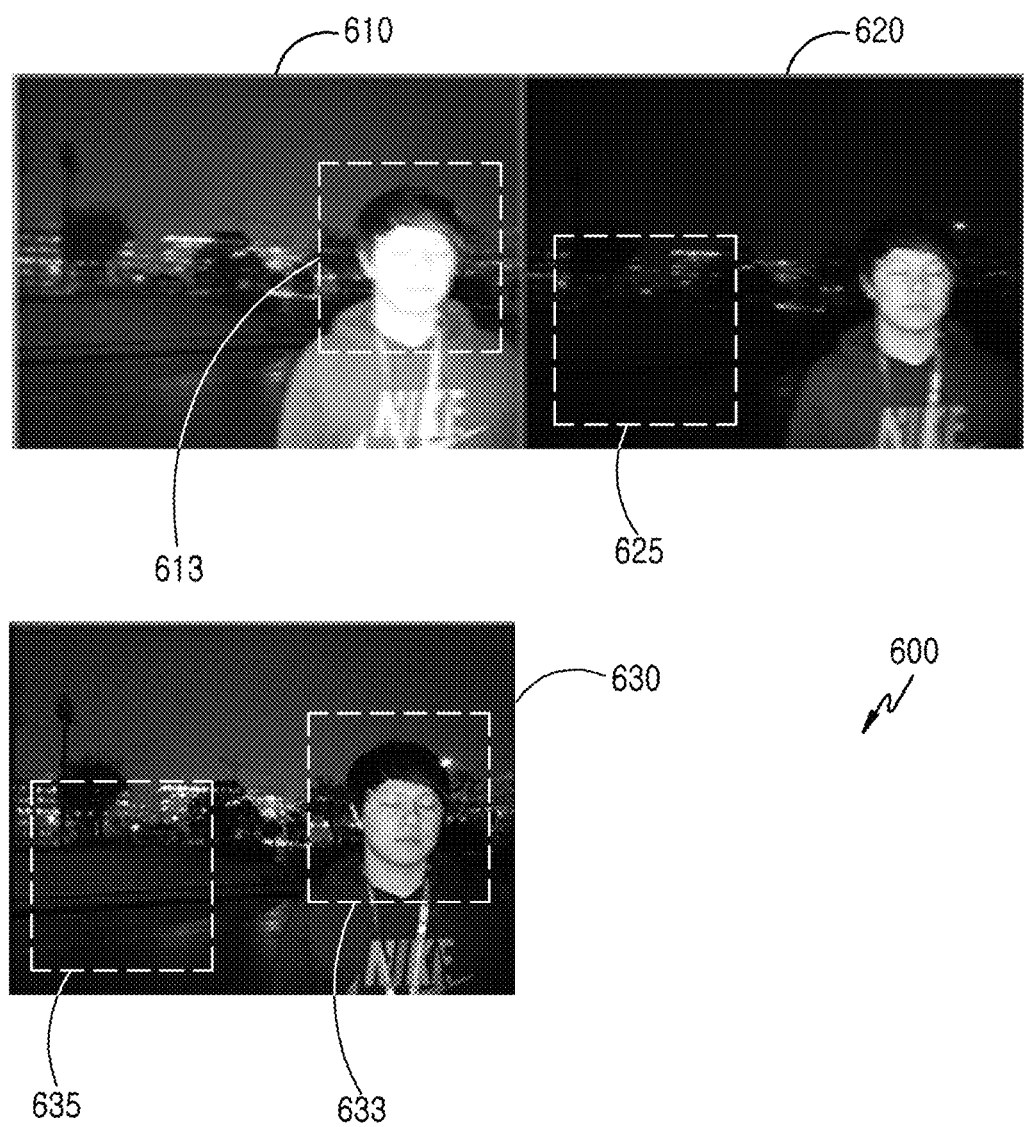
FIG. 6 illustrates images of a subject captured according to an embodiment of the present disclosure.

FIG. 6 illustrates images of a subject captured in various manners according to an embodiment of the present disclosure.

Referring to FIG. 6, a same emission time of the light emitting module and a same exposure time of the image sensor are applied to image information 610 and 620 based on a particular area. Image information 630 is captured according to an embodiment of the present disclosure. The image information 610 is acquired based on the exposure time and the emission time determined based on the bright area (e.g., the face of the main subject) of the subject. When the output image is acquired with the exposure time and the emission time determined based on the bright area (e.g., the face of the main subject) of the subject, a particular area (e.g., the face) 613 of the person is too white and the face 613 is blown out in the image information 610.

The image information 620 is acquired with the exposure time and the emission time determined based on the dark area (e.g., the background subject) of the subject. When the output image is acquired with the exposure time and the emission time determined based on the dark area (e.g., the road of the other subject) of the subject, the image information 620 represents the other area (e.g., the road 625) than the main subject (e.g., the person) area, too dark to identify subjects. When the flash light is not uniform and the same emission time and exposure time area applied, the exposure of the flash light onto the whole image is not adequate.

In the image information 630 captured with the exposure time and the emission time dynamically determined based on the state information (e.g., the brightness information) of the SA of the main subject, the person area 633 receives the adequate brightness to easily identify the person. Also, the background area 635 also receives the adequate brightness to identify the specific shape of the road. As such, the image of subject is captured with the adequate brightness and thus the enhanced final image can be acquired.

A method for acquiring an image of a subject includes acquiring a first preliminary image and a second preliminary image of the subject through an image sensor operatively coupled to an electronic device, determining a candidate emission time relating to output image acquisition of the subject, based on a difference between state information of at least part of the first preliminary image and state information of at least part of the second preliminary image, comparing the candidate emission time with a time corresponding to a synchronization period where a plurality of lines of the image sensor simultaneously acquires the output image, and acquiring the output image of the subject based on the comparison. The acquiring of the output image includes when the candidate emission time is smaller than or equal to the synchronization period, controlling a light emitting module operatively coupled to the electronic device to produce light during the candidate emission time in the synchronization period.

The acquiring of the first preliminary image and the second preliminary image includes determining whether a mode for acquiring the output image is a flash mode for lighting the light emitting module, and when the mode is the flash mode, acquiring the first preliminary image and the second preliminary image.

The acquiring of the first preliminary image and the second preliminary image includes acquiring the first preliminary image using the light emitting module of a first light intensity, and acquiring the second preliminary image using the light emitting module of a second light intensity which is different from the first light intensity.

The determining of the candidate emission time includes using brightness information as state information of the first preliminary image and the second preliminary image.

The determining of the candidate emission time includes determining brightness information of the first preliminary image based on state information of at least part of the first preliminary image, determining brightness information of the second preliminary image based on state information of at least part of the second preliminary image, and determining a brightness difference of the first preliminary image and the second preliminary image, based on the brightness information of the first preliminary image and the brightness information of the second preliminary image.

The determining of the candidate emission time includes determining brightness information of at least one of first ISAs of the first preliminary image, determining brightness information of at least one of second ISAs of the second preliminary image, determining at least one brightness difference of the first ISAs and the second ISAs, and determining the candidate emission time using the brightness difference corresponding to a preset priority of the at least one brightness difference.

The determining of the candidate emission time includes determining the candidate emission time based on at least one of the brightness of the first preliminary image and the second preliminary image, light intensity information corresponding to the first preliminary image and the second preliminary image, preset light intensity information for acquiring the output image, and preset image brightness information for acquiring the output image.

The determining of the candidate emission time includes determining an exposure time of the image sensor for the output image acquisition, based on the brightness difference of the first preliminary image and the second preliminary image.

The acquiring of the output image includes comparing the exposure time with a preset reference time relating to the emission time for the output image acquisition, and when the exposure time is smaller than or equal to the reference time, controlling the light emitting module to produce the light based on a sum of the exposure time and a third image readout time of the lines.

The acquiring of the output image includes when the candidate emission time is greater than the synchronization period, controlling the light emitting module to produce the light based on a sum of the exposure time and the output image readout time of the lines.

The lines comprises first through N-th (N is a natural number greater than 1) lines, and the acquiring of the output image includes using a period from a start of the output image information acquisition of the N-th line to an end of the output image information acquisition of the first line, as the synchronization period.

The method includes acquiring the first preliminary image without the emission of the light emitting module, and acquiring the second preliminary image with a preset intensity which is greater than non-emission, of the light emitting module.

The method includes using brightness information as the state information of the first preliminary image and the second preliminary image.

The method includes determining brightness information of the first preliminary image based on state information of at least part of the first preliminary image, determining brightness information of the second preliminary image based on state information of at least part of the second preliminary image, and determining a brightness difference of the first preliminary image and the second preliminary image, based on the brightness information of the first preliminary image and the brightness information of the second preliminary image.

The method includes determining brightness information of at least one of first ISAs of the first preliminary image, determining brightness information of at least one of second ISAs of the second preliminary image, and determining at least one brightness difference of the first ISAs and the second ISAs.

The method includes determining the candidate emission time using a maximum brightness difference of the at least one brightness difference.

The method includes determining an exposure time of the image sensor to acquire the output image, based on the brightness difference of the first preliminary image and the second preliminary image.

The method includes, when the candidate emission time is greater than the synchronization period, controlling the light emitting module to produce the light based on a sum of the exposure time and the output image readout time of the lines.

Figure 7:
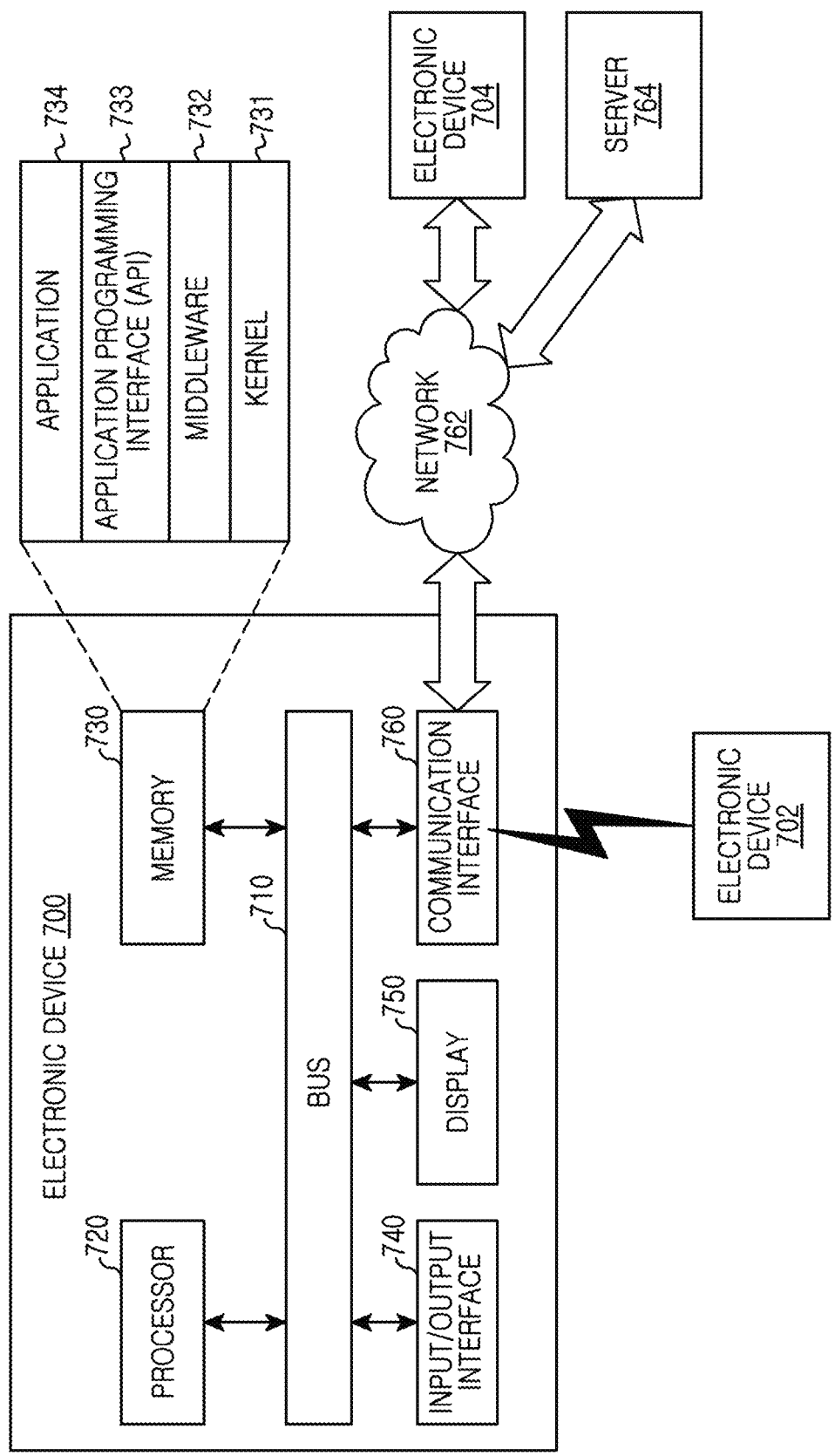
FIG. 7 illustrates a network environment of an electronic device according to an embodiment of the present disclosure.

FIG. 7 illustrates a network environment of an electronic device according to an embodiment of the present disclosure. For example, the electronic device of FIG. 7 can be the first electronic device 110 of FIG. 1.

Referring to FIG. 7, an electronic device 700 is illustrated, in which the electronic device 700 can include a bus 710, a processor 720, a memory 730, an input/output interface 740, a display 750, and a communication interface 760.

The bus 710 can be a circuit for interlinking the above-stated components and transferring communication (e.g., control messages) between the above-stated components.

The processor 720 can receive an instruction from the other components (e.g., the memory 730, the input/output interface 740, the display 750, and the communication interface 760) via the bus 710, interpret the received instruction, and perform an operation or a data processing according to the interpreted instruction.

The memory 730 can store the instruction or the data received from or generated by the processor 720 or the other components (e.g., the user input module 740, the display 750, and the communication interface 760). For example, the memory 730 can include programming modules of, for example, a kernel 731, a middleware 732, an Application Programming Interface (API) 733, and an application 734. The programming modules can be implemented using software, firmware, and hardware, or a combination of at least two of them.

The kernel 731 can control or manage system resources (e.g., the bus 710, the processor 720, and the memory 730) used to execute the operation or the function of the other programming modules, for example, the middleware 732, the API 733, or the application 734. Also, the kernel 731 can provide an interface allowing the middleware 732, the API 733, or the application 734 to access and to control or manage the individual component of the electronic device 700.

The middleware 732 can relay data between the API 733 or the application 734 and the kernel 731. In relation to task requests received from the application 734, the middleware 732 can, for example, control the task request (e.g., scheduling or load balancing) by giving priority of the system resource (e.g., the bus 710, the processor 720, or the memory 730) of the electronic device 700 to at least one of the applications 734.

The API 733, which is an interface for the application 734 to control the function provided from the kernel 731 or the middleware 732, can include at least one interface or function (e.g., instruction) for, for example, file control, window control, image processing, or text control.

The input/output interface 740 can forward the instruction or the data input from the user to the processor 720 or the memory 730, for example, via the bus 710. Also, the input/output interface 740 can output audio information received from the memory 730 or the communication interface 760, for example, via the bus 710.

The display 750 can display a still image, a moving image, or data to the user.

The communication interface 760 can connect the communication between one or more other electronic devices 702 and the electronic device 700. The communication interface 760 can support a short-range communication protocol (e.g., Wireless Fidelity (Wifi), Wifi-direct, WiGig, Bluetooth (BT), Bluetooth Low Energy (BLE), Zigbee, UWB, Near Field Communication (NFC), RFID, audio sync, Electric Field Communication (EFC), Human Body Communication (HBC), or VLC) or a network communication 762 (e.g., Internet, Local Area Network (LAN), Wire Area Network (WAN), telecommunication network, cellular network, satellite network, or Plain Old Telephone Service (POTS)) to communicate to an electronic device 704 and a server 764. The electronic devices 702 and 704 can be the same as or different from the electronic device 700 in type.

Figure 8:
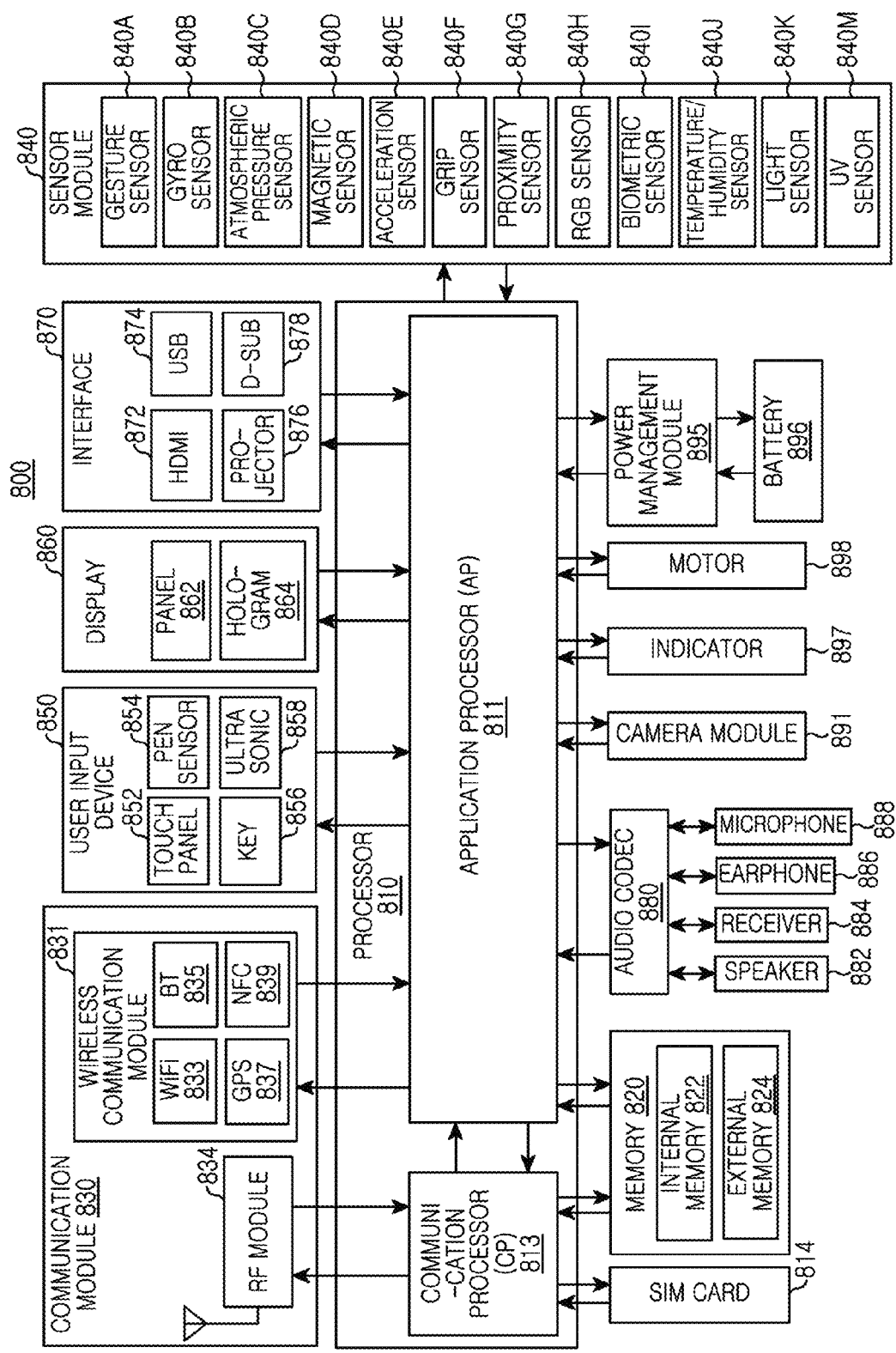
FIG. 8 illustrates an electronic device according to an embodiment of the present disclosure.

FIG. 8 illustrates an electronic device according to an embodiment of the present disclosure. The electronic device of FIG. 8 can be the electronic device 100 of FIG. 1.

Referring to FIG. 8, an electronic device 800 is illustrated, where the electronic device can include one or more processors 810, a Subscriber Identity Module (SIM) card 814, a memory 820, a communication module 830, a sensor module 840, a user input device 850, a display 860, an interface 870, an audio codec 880, a camera module 891, a power management module 895, a battery 896, an indicator 897, and a motor 898.

The processor 810 can include one or more Application Processors (APs) 811 or one or more Communication Processors (CPs) 813. The processor 810 can be the processor 720 of FIG. 7. While the AP 811 and the CP 813 are included in the processor 810 in FIG. 8, the AP 811 and the CP 813 can be included to different IC packages. For example, the AP 811 and the CP 813 can be included in a single IC package.

The AP 811 can control a plurality of hardware or software components connected to the AP 811 by driving an operating system or an application program, and carry out various data processing and operations including multimedia data. The AP 811 can be implemented using, for example, a System on Chip (SoC). The processor 810 can further include a Graphic Processing Unit (GPU) (not shown).

The CP 813 manages data links and converts the communication protocol in the communication between the electronic device (e.g., the electronic device 200) including the electronic device 800 and the other electronic devices connected over the network. The CP 813 can be implemented using, for example, the SoC. The CP 813 can perform at least part of a multimedia control function. The CP 813 can identify and authenticate the electronic device using a subscriber identification module (e.g., the SIM card 814) in the communication network. The CP 813 can provide the user with services such as voice call, video call, text message, and packet data.

The CP 813 can control data transmission and reception of the communication module 830. While the components of the CP 813, the power management module 895, and the memory 820 are depicted separately from the AP 811 in FIG. 8, the AP 811 can include at least part (e.g., the CP 813) of the above-stated components.

The AP 811 or the CP 813 can load and process the instruction or the data received from its connected non-volatile memory or at least one of the other components, in a volatile memory. Also, the AP 811 or the CP 813 can store data received from or generated by at least one of the other components, in the non-volatile memory.

The SIM card 814 can be a card including the subscriber identity module and be inserted to a slot formed at a specific location of the electronic device. The SIM card 814 can include unique identification information (e.g., Integrated Circuit Card Identifier (ICCID)) or subscriber information (e.g., International Mobile Subscriber Identity (IMSI)).

The memory 820 can include an internal memory 822 or an external memory 824. The memory 820 can be, for example, the memory 730 of FIG. 7. The internal memory 822 can include at least one of, for example, volatile memory (e.g., Dynamic RAM (DRAM), Static RAM (SRAM), Synchronous Dynamic RAM (SDRAM)) or non-volatile memory (e.g., One-Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory). The internal memory 822 may employ a Solid State Drive (SSD). The external memory 824 can further include a flash drive, for example, a Compact Flash (CF), a Secure Digital (SD), a Micro-Secure Digital (SD), a Mini-SD, an extreme digital (xD), or a memory stick.

The communication module 830 can include a wireless communication module 831 and a Radio Frequency (RF) module 834. The communication module 830 can be, for example, the communication interface 760 of FIG. 7. The wireless communication module 831 can include, for example, a Wifi 833, a BT 835, a GPS 837, and an NFC 839. For example, the wireless communication module 831 can provide a wireless communication function using a radio frequency. Additionally or substantially, the wireless communication module 831 can include a network interface (e.g., LAN card) or a modem for connecting the hardware 800 to the network (e.g., Internet, LAN, WAN, telecommunication network, cellular network, satellite network, or POTS).

The RF module 834 can control the data transmission and reception including the transmission and reception of the RF signal or the paged electric signal. For example, the RF module 834 can includes a transceiver, a Pulse Amplitude Modulation (PAM), a frequency filter, or a Low Noise Amplifier (LNA), which are not shown. The RF module 834 can further include a component, e.g., a conductor or a conducting wire, for sending and receiving electromagnetic waves in free space in the wireless communication.

The sensor module 840 can include at least one of a gesture sensor 840A, a gyro sensor 840B, an atmospheric pressure sensor 840C, a magnetic sensor 840D, an acceleration sensor 840E, a grip sensor 840F, a proximity sensor 840G, a Red Green Blue (RGB) sensor 840H, a biometric sensor 840I, a temperature/humidity sensor 840J, a light sensor 840K, and an UltraViolet (UV) sensor 840M. The sensor module 840 can measure a physical quantity or detect the operation status of the electronic device, and convert the measured or detected information to an electric signal. Additionally or substantially, the sensor module 840 can include an E-noise sensor, an electromyography (EMG) sensor, an electroencephalogram (EEG) sensor, an electrocardiogram (ECG) sensor, or a finger print sensor. The sensor module 840 can further include a control circuit for controlling its one or more sensors.

The user input device 850 can include a touch panel 852, a (digital) pen sensor 854, a key 856, and an ultrasonic input device 858. For example, the user input device 850 can be the user input/output interface 740 of FIG. 7. The touch panel 852 can recognize the touch input using at least one of capacitive, resistive, infrared, and Surface Acoustic Wave (SAW) techniques. The touch panel 852 may further include a controller (not shown). The capacitive touch panel can recognize not only the direct touch but also the proximity. The touch panel 852 may further include a tactile layer. In this case, the touch panel 852 can provide a tactile response to the user.

The (digital) pen sensor 854 can be implemented using the same or similar method as or to the user's touch input, or using a separate recognition sheet. The key 856 can include a keypad or a touch key. The ultrasonic input device 858, which obtains data by detecting microwave through a microphone (e.g., a microphone 888) in the electronic device 800, allows radio frequency identification through the pen which generates an ultrasonic signal. The electronic device 800 may receive the user input from the external device (e.g., network, computer, or server) connected using the communication module 830.

The display 860 can include a panel 862 or a hologram 864. For example, the display 860 can be the display 750 of FIG. 7. The panel 862 can employ a Liquid Crystal Display (LCD) or an Active Matrix Organic Light Emitting Diode (AMOLED). The panel 862 can be implemented flexibly, transparently, or wearably. The panel 862 may be constructed as the single module with the touch panel 852. The hologram 864 can present a three-dimensional image in the air using interference of light. The display 860 can further include a control circuit for controlling the panel 862 and the hologram 864.

The interface 870 can include a High Definition Multimedia Interface (HDMI) 872, a Universal Serial Bus (USB) 874, a projector 876, and a D-sub 878. Additionally or substantially, the interface 870 can further include a SD/MMC (not shown) or Infrared Data Association (IrDA) (not shown).

The audio codec 880 can convert the voice to an electric signal and vice versa. For example, the audio codec 880 can convert voice information which is input or output through a speaker 882, a receiver 884, an earphone 886, or the microphone 888.

The camera module 891 can capture a still picture and a moving picture. For example, the camera module 891 can include one or more image sensors (e.g., front lens or rear lens), an Image Signal Processor (ISP), or a flash LED.

The power management module 895 can manage power of the hardware 800. For example, the power management module 895 can include a Power Management IC (PMIC), a charging IC, or a battery gauge.

For example, the PMIC can be mounted in an IC or a SoC semiconductor. The charging type of the power management module 895 can be divided to a wired type and a wireless type. The charging IC can charge the battery and prevent overvoltage or overcurrent from flowing from a charger. The charging IC can include a charging IC for at least one of the wired charging type or the wireless charging type. For example, the wireless charging type includes magnetic resonance, magnetic induction, and microwave, and can further include an additional circuit, for example, coil loop, resonance circuit, rectifier circuit for the wireless charging.

The battery gauge can measure the remaining capacity of the battery 896 and the voltage, the current, or the temperature of the charging. The battery 896 can supply the power by generating the electricity. For example, the battery 896 can be a rechargeable battery.

The indicator 897 can display a specific status, e.g., booting state, message state, or charging state, of the electronic device 800 or part (e.g., AP 811) of the electronic device 800. The motor 898 can convert the electric signal to a mechanic vibration. An MCU 899 can control the sensor module 840

In addition, the electronic device 800 can further include a processor (e.g., GPU) for supporting mobile TV. For example, the processor for supporting the mobile TV can process media data in conformity with Digital Multimedia Broadcasting (DMB), Digital Video Broadcasting (DVB), or media flow standard. The names of the hardware components of the present disclosure can differ according to the type of the electronic device. The hardware of the present disclosure can include at least one of the components, omit some components, or further include other components. Some of the hardware components can be united to the single entity to carry out the same functions of the corresponding components.

The term "module" used in various embodiments of the present disclosure can indicate, for example, a unit including a combination of one or more of hardware, software, or firmware. The "module" can be interchangeably used with the term, for example, a unit, logic, a logical block, a component, or a circuit. The "module" can be a minimum unit or part of the components integrally formed. The "module" may be a minimum unit or part for one or more functions. The "module" can be implemented mechanically or electronically. For example, the "module" according to various embodiments of the present disclosure can include at least one of an Application-Specific Integrated Circuit (ASIC) chip, Field-Programmable Gate Arrays (FPGAs), or a programmable-logic device for performing operations which are well known or to be invented.

The module or the programming module according to various embodiments of the present disclosure can include at least one of the aforementioned components, omit some components, or further include other components. The operations fulfilled by the modules, the programming modules, or other components according to various embodiments of the present disclosure can be carried out in sequence, in parallel, repeatedly, or heuristically. Also, some operations can be executed in a different order or omitted, or other operations can be added.

Various embodiments can be realized as program instructions executable by various computer means (e.g., the processor) and recorded in a non-transitory computer-readable recording medium. The computer-readable recording medium can include a computer program, a program instruction, a data file, and a data structure alone or in combination. The program instruction recorded in the recording medium can be specially designed for the present disclosure or well-known to those skilled in computer software.

The computer-readable recording medium can include magnetic media such as hard disk, floppy disk and magnetic tape, optical media such as Compact Disc Read Only Memory (CD-ROM) and Digital Versatile Disc (DVD), magneto-optical media such as floptical disk, and hardware devices specifically configured to store and execute the program instruction (e.g., the programming module) such as Read Only Memory (ROM), Random Access Memory (RAM), and flash memory. Also, the program instruction can include not only a machine code made by a complier but also a high-level language code executable by a computer using an interpreter. The above-stated hardware device can serve as one or more software modules for fulfilling the operations of various embodiments of the present disclosure, and vice versa.

As set forth above, the method and the apparatus for acquiring the image determines the emission time and the exposure time of the image sensor by considering the exposure difference of the flash light, and thus acquire the image with the adequate brightness on the main subject (e.g., the focused person or object) and the other subject (e.g., the background excluding the main subject). Also, the method and the apparatus for acquiring the image can acquire the image with the adequate brightness using the algorithm without having to use a separate device such as Xenon flash for producing the strong light up to the other subject. Thus, the manufacturing cost of the camera module for generating the enhanced image captured can be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
   acquiring, at an electronic device, a first preliminary image and a second preliminary image for a subject through an image sensor operatively coupled to the electronic device;
   determining a candidate emission time related to an acquisition of an output image for the subject, based on a difference between state information of at least part of the first preliminary image and state information of at least part of the second preliminary image;
   comparing the candidate emission time to a synchronization period where a plurality of lines of the image sensor simultaneously acquires the output image; and
   acquiring the output image for the subject based at least in part on the comparison,
   wherein the acquiring the output image comprises, when the candidate emission time is smaller than or equal to the synchronization period, controlling a light emitting module operatively coupled to the electronic device to produce light at the candidate emission time in the synchronization period.

2. The method of claim 1, wherein the acquiring the first preliminary image and the second preliminary image is performed during a flash mode where the light emitting module emits light.

3. The method of claim 1, wherein the acquiring the first preliminary image and the second preliminary image comprises:
   acquiring the first preliminary image using the light emitting module at a first light intensity; and
   acquiring the second preliminary image using the light emitting module at a second light intensity different from the first light intensity.

4. The method of claim 1, wherein the determining the candidate emission time comprises:
   using brightness information as the state information for the at least part of the first preliminary image and the at least part of the second preliminary image.

5. The method of claim 1, wherein the determining the candidate emission time comprises:
   determining first brightness information for the first preliminary image based on the state information of the at least part of the first preliminary image;

determining second brightness information of the second preliminary image based on the state information of the at least part of the second preliminary image; and obtaining a brightness difference between the first preliminary image and the second preliminary image, based on the brightness information and the second brightness information.

6. The method of claim 5, wherein the determining the candidate emission time further comprises:

determining an exposure time of the image sensor for the acquisition of the output image, based on the brightness difference.

7. The method of claim 6, wherein the acquiring the output image further comprises:

comparing the exposure time with a specified reference time relating to an emission time for the acquisition of the output image; and when the exposure time is smaller than or equal to the specified reference time, controlling the light emitting module to produce the light based on at least in part a sum of the exposure time and a third image readout time of the plurality of lines.

8. The method of claim 6, wherein the acquiring the output image further comprises:

when the candidate emission time is greater than the synchronization period, controlling the light emitting module to produce the light based on at least in part a sum of the exposure time and the output image readout time of the plurality of lines.

9. The method of claim 1, wherein the first preliminary image includes one or more first sub image areas, and the second preliminary image includes one or more second sub image areas, and wherein the determining of the candidate emission time comprises:

determining first brightness information of at least one of the one or more first sub image areas;

determining second brightness information of at least one of the one or more second sub image areas;

determining at least one brightness difference between the one or more first sub image areas and the one or more second sub image areas based on at least in part the first brightness information and the second brightness information; and identifying the candidate emission time using a specified brightness difference corresponding to a specified priority among the at least one brightness difference.

10. The method of claim 1, wherein the determining the candidate emission time comprises:

Identifying the candidate emission time based on at least one of a brightness for the first preliminary image and the second preliminary image, light intensity information corresponding to the first preliminary image and the second preliminary image, specified light intensity information for acquiring the output image, and specified image brightness information for acquiring the output image.

11. The method of claim 1, wherein the plurality of lines includes first through N-th lines, wherein N is a natural number greater than 1, and wherein the acquiring the output image comprises:

using a period from a start of an acquisition of at least a portion of the output image of the N-th line to an end of an acquisition of at least a portion of the output image of the first line, as the synchronization period.

12. An electronic device comprising:

a light emitting module configured to emit light;

an image sensor to acquire a first preliminary image and a second preliminary image for the subject;

a calculation module to determine a difference between state information of at least part of the first preliminary image and state information of at least part of the second preliminary image; and a determination module to determine a candidate emission time related to an acquisition of an output image for the subject, based on the difference, wherein the determination module is configured to compare the candidate emission time with a time corresponding to a synchronization period where a plurality of lines of the image sensor simultaneously acquires the output image, and when the candidate emission time is smaller than or equal to the synchronization period, to acquire the output image by controlling the light emitting module to produce light during the candidate emission time in the synchronization period.

13. The electronic device of claim 12, wherein the image sensor is configured to acquire the first preliminary image with a non-emission of the light emitting module, and to acquire the second preliminary image with a specified intensity which is greater than the non-emission of the light emitting module.

14. The electronic device of claim 12, wherein the calculation module is configured to use brightness information as the state information of the at least part of the first preliminary image and the at least part of the second preliminary image.

15. The electronic device of claim 12, wherein the calculation module is configured to determine first brightness information of the first preliminary image based on the state information of the at least part of the first preliminary image, to determine second brightness information of the second preliminary image based on the state information of the at least part of the second preliminary image, and to determine a brightness difference between the first preliminary image and the second preliminary image, based on the first brightness information and the second brightness information.

16. The electronic device of claim 15, wherein the determination module is configured to determine an exposure time of the image sensor to acquire the output image, based on the brightness difference.

17. The electronic device of claim 16, wherein, the determination module is configured to control the light emitting module to emit light based on a sum of the exposure time and the output image readout time of the plurality of lines, when the candidate emission time is greater than the synchronization period.

18. The electronic device of claim 12, wherein the calculation module is further configured to determine brightness information of at least one of one or more first sub image areas of the first preliminary image, determine brightness information of at least one of one or more second sub image areas of the second preliminary image, and determine at least one brightness difference between the one or more first sub image areas and the one or more second sub image areas.

19. The electronic device of claim 18, wherein the determination module is configured to determine the candidate emission time using a maximum brightness difference among the at least one brightness difference.

20. A non-transitory computer-readable recording medium having a computer program recorded thereon, the computer program causing a computer to execute a method comprising:

acquiring a first preliminary image and a second preliminary of a subject through an image sensor operatively coupled to an electronic device;

determining a candidate emission time relating to an acquisition of an output image of the subject, based on a difference between state information of at least part of the first preliminary image and state information of at least part of the second preliminary image;

comparing the candidate emission time with a time corresponding to a synchronization period where a plurality of lines of the image sensor simultaneously acquires the output image; and acquiring the output image of the subject based on the comparison, wherein the acquiring the output image comprises, when the candidate emission time is smaller than or equal to the synchronization period, controlling a light emitting module operatively coupled to the electronic device to produce light at the candidate emission time in the synchronization period.

* * * * *